United States Patent
Nishioka et al.

Patent Number: 5,140,085
Date of Patent: Aug. 18, 1992

[54] α-CYANOACRYLATE ADHESIVE COMPOSITION OF MATTER

[75] Inventors: Yoshinobu Nishioka; Toshio Sugimae; Kenichiro Hirai; Tateki Tsugiyama, all of Chiba, Japan

[73] Assignee: Koatsu Gas Kogyo Co., Ltd., Osaka, Japan

[21] Appl. No.: 821,761

[22] Filed: Jan. 15, 1992

[30] Foreign Application Priority Data

Jan. 24, 1991 [JP] Japan ................. 3-25620

[51] Int. Cl.$^5$ ............... C08F 222/32; C08F 220/58; C08F 220/36; C08F 216/12
[52] U.S. Cl. .................. 526/304; 526/312; 526/328.5; 526/333
[58] Field of Search ..................... 526/304

[56] References Cited

U.S. PATENT DOCUMENTS 3,839,065 10/1974 Overhults et al. ................. 106/481

Primary Examiner—Joseph L. Schofer
Assistant Examiner—Wu C. Cheng
Attorney, Agent, or Firm—Koda and Androlia

[57] ABSTRACT

An α-cyanoacrylate adhesive composition of matter consisting essentially of 100 weight parts of α-cyanoacrylate and 0.01~0.1 weight parts of at least a compound represented by a general formula

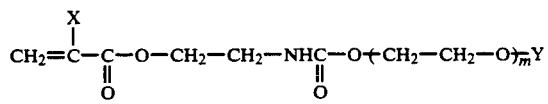

or

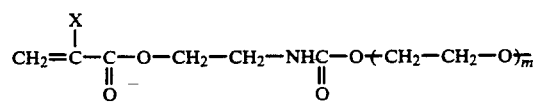

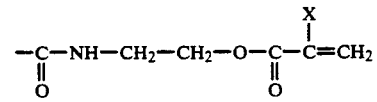

wherein X represents a hydrogen atom or methyl group and Y an R or RCO (R represents a hydrocarbon residual group not containing any anion polymeric group) and m is an integer of $100 \geq m \geq 4$. By addition of the above compound to α-cyanoacrylate the adhesive's set time can be shortened and the adhesion strength in the initial stage can be improved even if the surface of the material to be adhered is acidic or tends to dry.

5 Claims, No Drawings

α-CYANOACRYLATE ADHESIVE COMPOSITION OF MATTER

BACKGROUND OF THE INVENTION

1. Field of the Invention

The present invention relates to α-cyanoacrylate adhesive composition of matter for improvement of initial adhesion strength and set time.

2. Prior Art

α-cyanoacrylate being conventionally used as adhesive composition of matter represented by a general formula

(where R' represents alkyl group, alkenyl group, aralkyl group, haloalkyl group, dicyclohexyl group, phenyl group et cetera with a carbon number of not more than 16) has property susceptible to anionic polymerization and liable to be polymerized to set within a short time of several seconds ~ several minutes at normal temperature through the action of various anion active substances such as water adhering to the surface of a solid substance, humidity in the atmosphere and other alkaline substances even in the absence of any catalyst. It has, therefore, hitherto been widely used as a material of instantaneous adhesives for industrial, medical and general household uses.

The α-cyanoacrylate adhesive, however, has a defect of its set time getting markedly longer if the surface to be adhered should be acidic or the quantity of water should be too small and, when the materials to be adhered are such as wooden articles, zinc chromate-plated steel plates, polyester, bakelite or EPDM, the set time is unduly long and the adhesion strength is too low.

As a prior art for improving the initial adhesion strength of α-cyanoacrylate adhesives has been known a method of using a polyalkyl ether (metha)acrylate-type plasticizer in combination with polyhydroxyphenyl carboxylic acid ester, pyrogallol or the like (Japanese Patent Publication No. 26513/1985, Japanese Patent Publication No. 41668/1989), but there was still to be desired about the set time and the initial adhesion strength strength attainable with the aforementioned difficult-to-adhere materials, this being an important problem still to be solved.

SUMMARY OF THE INVENTION

After intensive studies and researches for improvement of the aforementioned problems conventional α-cyanoacrylate adhesive has borne, the present inventors discovered that the set time as well as the adhesion strength and further the storage stability can be improved by adding to α-cyanoacrylate a compound having acryloxy group or methacryloxy group co-polymerizable with α-cyanoacrylate and also an urethane linkage in its structure of molecule without loss of any of the known favorable properties of α-cyanoacrylate and could thus arrive at the present invention.

In the present invention the aforementioned reactive compounds to be added to cyanoacrylate are represented by the following general formula (1) or (2).

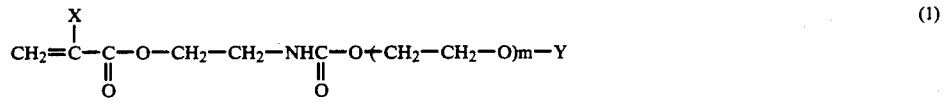

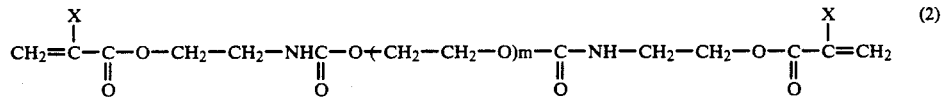

wherein X represents a hydrogen atom or methyl group and Y an R or RCO (R, in turn, represents a hydrocarbon residual group not containing any anion polymeric group) and m is an integer of $100 \geq m \geq 4$.

As the reactive compound represented by the aforementioned, reactive compound any one of those represented by the following chemical formulae may preferably be used.

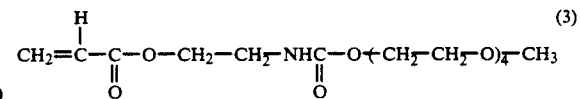

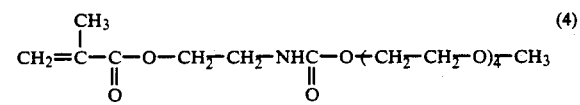

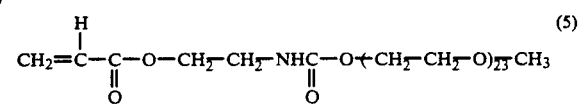

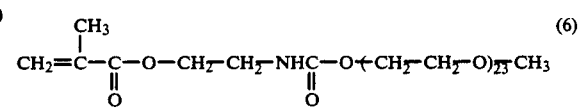

As the reactive compound of general formula (2) above, the substances represented by the following chemical formulae, among others, may preferably be used.

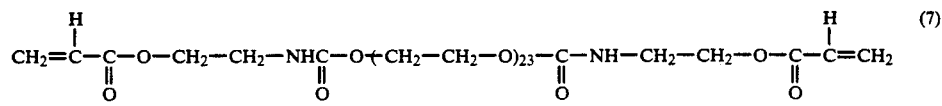

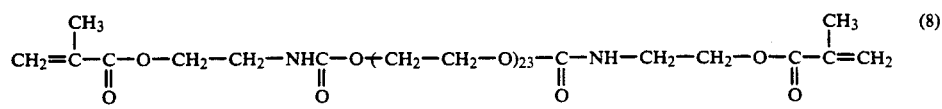

-continued

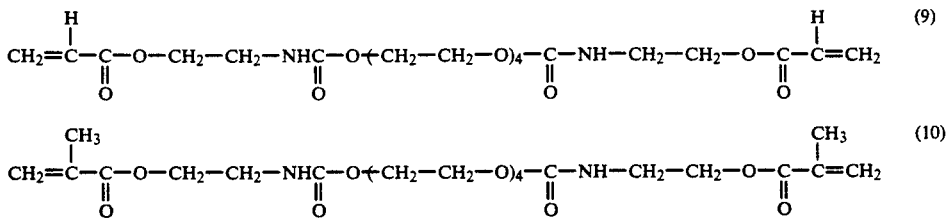

The amount to be added of such compounds is most preferably within a range of 0.01~1.0 weight parts to 100 weight parts of α-cyanoacrylate. If it is more than 1.0 parts, it results in a too high viscosity and too long set time of the adhesive in question, while, if it is less than 0.01 parts, it results in an insufficient acceleration of setting and resultant failure of shortening the set time and improving the adhesion strength. Of the compounds represented by the above general formulae (1) and (2), those with the integer n less than 4 are less effective to shorten the set time, while, if the integer is not less than 100, the solubility for α-cyanoacrylate monomer tends to get worse.

EXAMPLES

The reactive compound represented by the general formula (2) was prepared by stirring a mixture of 2-methacryloyloxyethyl isocyanate and polyethylene glycol for several hours under heating at 40°~70° C. in the presence of an organic tin compound (di-n-butyl tin dilaurate et cetera). The number m in the formula (2) was adjusted through proper selection of the number of repetition m of $CH_2$—$CH_2$—O in the material polyethylene glycol. The reactive compounds in the formulae (4) and (6) could be easily synthesized by letting 2-methacryloyloxyethyl isocyanate react with methoxypolyethylene.

A starting adhesive solution, to which the aforementioned compound was added, was prepared by adding a stabilizer; 0.002 weight parts of boron trifluoride, ethyl ether complex, polymerization inhibitor; 0.05 weight parts of hydroquinone, thickener; and 5 weight parts of polymethyl methacrylate.

The adhesive behavior test of the adhesive composition of matter according to the present invention prepared by adding compounds (1) or (2) was carried out as follows. As materials to be adhered were selected steel plate, zinc chromate-plated steel plate and birch plate, each surface of the materials was coated with the adhesive composition of matter, the same kind of the materials to be adhered to the above materials were pressed onto the coated surface via the adhesive and the set time, tensile shear strength after setting, compressive shear strength and storage stability of the aforementioned composition were tested. These tests were made according to JIS (Japanese Industrial Standard) as below.

1. Set time: JIS K6861 "Test method for α-cyanoacrylate-based adhesives"
2. Tensile shear strength: JIS K6861 "Test method for α-cyanoacrylate-based adhesives"
3. Compressive shear strength: JIS K6852 "Test method for adhesive's compressive shear strength"
4. Storage stability: JIS K6861 "Test method for α-cyanoacrylate-based adhesives"

EXAMPLES 1~4

From compounds $X=CH_3$ represented by the general formula (1), those corresponding to m=4 [formula (4)], m=9, m=23 [formula (6)] and m=90 were selected, 0.5 weight parts each thereof was added to the above starting adhesive solution to prepare Examples 1~4, and the aforementioned adhesive behavior tests were carried out with each thereof.

Meanwhile, adhesive composition of matters containing only the starting adhesive solution free from any reactive compounds was prepared as Comparative Example 1. these compounds of general formula $X=CH_3$ with m=1~3 were prepared, as Comparative Examples 2~4, and a starting adhesive solution containing compounds represented by the following general formula (11) but containing no urethane linkage with P=4, 9, 23 and 90 were prepared as Comparative Examples 5~8., and the same adhesion tests were carried out with Comparative Examples 1~8. The results were as shown in Table 1.

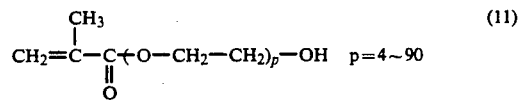

TABLE 1

|  |  | Setting time (second) | | | Tensile shear strength (kgf/cm²) | | | Compressive shear strength (kgf/cm²) Birch plate | Storage stability 70° C. × 5 days |
|---|---|---|---|---|---|---|---|---|---|
|  |  | Steel plate | Zinc-chromate-coated-steel plate | Birch plate | Steel plate | Zinc-chromate-coated-steel plate |  |  |  |
| Comparative example 1 | No addition | 60 | 90 | 300 or more | 210 | 140 | 110 | no change |
| Comparative example 2 | m ≈ 1 | 60 | 90 | 300 or more | 210 | 180 | 140 | " |
| Comparative example 3 | m ≈ 2 | 60 | 90 | 300 or more | 210 | 180 | 140 | " |
| Comparative example 4 | m ≈ 3 | 40 | 70 | 300 | 220 | 190 | 175 *1 | " |
| Comparative example 5 | p ≈ 4 | 30 | 40 | 130 | 240 | 200 | 200 *2 | " |

TABLE 1-continued

| | | Setting time (second) | | | Tensile shear strength (kgf/cm²) | | Compressive shear strength (kgf/cm²) Birch plate | Storage stability 70° C. × 5 days |
|---|---|---|---|---|---|---|---|---|
| | | Steel plate | Zinc-chromate-coated-steel plate | Birch plate | Steel plate | Zinc-chromate-coated-steel plate | | |
| Comparative example 6 | p ≈ 9 | 20 | 30 | 80 | 230 | 210 | 200 *2 | " |
| Comparative example 7 | p ≈ 23 | 10 | 15 | 40 | 230 | 210 | 200 *2 | " |
| Comparative example 8 | p ≈ 90 | 10 | 15 | 40 | 210 | 210 | 200 *2 | " |
| Comparative example 1 | m ≈ 4 | 25 | 30 | 100 | 240 | 230 | 200 *2 | " |
| Comparative example 2 | m ≈ 9 | 15 | 20 | 50 | 240 | 240 | 200 *2 | " |
| Comparative example 3 | m ≈ 23 | 5 | 10 | 30 | 230 | 240 | 200 *2 | " |
| Comparative example 4 | m ≈ 90 | 5 | 10 | 30 | 220 | 230 | 200 *2 | " |

*1: Material partly broken
*2: Material wholly broken

EXAMPLES 5~8

The aforementioned starting adhesive solution was admixed with 0.5 weight parts of compounds represented by the formula $X=CH_3$ of the general formula (2) with m=4 [substance of formula (10)], m=14, m=23 [formula (8)] and m=90 and with those adhesive composition of matters to prepare Examples 5~8, and adhesive behavior tests were carried out by the same method as described in Examples 5~8.

For comparison, Comparative Example 1 was prepared to consist of the above adhesive solution only, the same starting adhesive solutions were admixed with compounds represented by $X=CH_3$ of the general formula (2) with m=1~3 to prepare Comparative Examples 16~19, and the same starting adhesive solution were admixed with reactive compounds of the following general formula (12) with q=4, 14, 23 and 90 to prepare Comparative Examples 12~15 respectively.

Comparative tests were also carried out with these Comparative Examples 1 and 16~19. The result was as shown in Table 2.

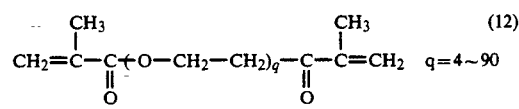

(12)    $CH_2=C-C(-O-CH_2-CH_2)_q-C-C=CH_2$  with methyl groups on the carbons adjacent to C=CH₂ and carbonyls,  q=4~90

TABLE 2

| | | Setting time (second) | | | Tensile shear strength (kgf/cm²) | | Compressive shear strength (kgf/cm²) Birch plate | Storage stability 70° C. × 5 days |
|---|---|---|---|---|---|---|---|---|
| | | Steel plate | Zinc-chromate-coated-steel plate | Birch plate | Steel plate | Zinc-chromate-coated-steel plate | | |
| Comparative example 1 | no addition | 60 | 90 | 300 or more | 210 | 140 | 110 | no change |
| Comparative example 9 | m ≈ 1 | 60 | 90 | 300 or more | 210 | 180 | 140 | " |
| Comparative example 10 | m ≈ 2 | 60 | 90 | 300 or more | 210 | 180 | 140 | " |
| Comparative example 11 | m ≈ 3 | 40 | 70 | 300 | 220 | 190 | 180 *1 | " |
| Comparative example 12 | q ≈ 4 | 30 | 40 | 120 | 230 | 200 | 200 *2 | " |
| Comparative example 13 | q ≈ 14 | 15 | 20 | 60 | 230 | 210 | 200 *2 | " |
| Comparative example 14 | q ≈ 23 | 10 | 15 | 40 | 230 | 200 | 200 *2 | " |
| Comparative example 15 | q ≈ 90 | 10 | 15 | 40 | 220 | 200 | 200 *2 | " |
| Comparative example 5 | m ≈ 4 | 20 | 25 | 80 | 240 | 230 | 200 *2 | " |
| Comparative example 6 | m ≈ 14 | 10 | 15 | 40 | 250 | 240 | 200 *2 | " |
| Comparative example 7 | m ≈ 23 | 5 | 10 | 25 | 240 | 250 | 200 *2 | " |
| Comparative example 8 | m ≈ 90 | 5 | 10 | 25 | 220 | 220 | 200 *2 | " |

*1: Material partly broken
*2: Material wholly broken

EXAMPLES 9~18

The aforementioned starting adhesive solutions were admixed with not more than 5 weight parts of compounds of formula (6) or (8) ($X=CH_3$, n≈23) to prepare Examples 9~18, and adhesive behavior tests were carried out with Examples 9~18 in the same way as described above.

In these tests examined were the influences that the quantity of the admixed reactive compounds have on the adhesion properties. More specifically, Examples 9~18 were prepared by adding 0.01~1 weight parts of those compounds of the formula (6) or (8) (X=CH₃, m≈23) to 100 weight parts of α-cyanoacrylate, Comparative Examples 16~21 were also prepared by the addition of 0.005 and 5 weight parts either of compounds of formulae (6) and (8) to 100 weight parts of α-cyanoacrylate and by the addition of no compound. The result was as shown in Table 3.

improve the setting property in the initial stage of setting. This is supposed to be due to the presence of urethane linkage in the reactive compound but the reaction mechanism has not yet been clarified to date.

By the use of α-cyanoacrylate adhesive composition of matter of the present invention it is possible to markedly improve the setting time in the initial stage of setting and also to improve the adhesion strength after setting even if the material to be adhered has its surface

TABLE 3

| | Weight parts of chemical of formula 6 | Weight parts of chemical of formula 8 | Setting time (second) | | | Tensile shear strength (kgf/cm²) | | Compressive shear strength (kgf/cm²) Birch plate | Storage stability 70° C. × 5 days |
|---|---|---|---|---|---|---|---|---|---|
| | | | Steel plate | Zinc-chromate-coated-steel plate | Birch plate | Steel plate | Zinc-chromate-coated-steel plate | | |
| Comparative example 16 | 0 | | 60 | 90 | 300 or more | 210 | 140 | 110 | no change |
| Comparative example 17 | 0.005 | | 40 | 60 | 300 | 210 | 180 | 150 | no change |
| Comparative example 18 | 5 | | 10 | 25 | 45 | 180 | 170 | 200 *2 | increase in viscosity |
| Comparative example 19 | | 0 | 60 | 90 | 300 or more | 210 | 140 | 110 | no change |
| Comparative example 20 | | 0.005 | 35 | 60 | 300 | 210 | 180 | 150 | no change |
| Comparative example 21 | | 5 | 10 | 20 | 40 | 180 | 170 | 200 *2 | increase in viscosity |
| Comparative example 9 | 0.01 | | 20 | 50 | 120 | 240 | 210 | 200 *2 | no change |
| Comparative example 10 | 0.05 | | 10 | 30 | 70 | 220 | 210 | 200 *2 | no change |
| Comparative example 11 | 0.1 | | 5 | 20 | 50 | 220 | 220 | 200 *2 | no change |
| Comparative example 12 | 0.5 | | 5 | 10 | 30 | 230 | 240 | 200 *2 | no change |
| Comparative example 13 | 1.0 | | 5 | 10 | 30 | 240 | 200 | 200 *2 | no change |
| Comparative example 14 | | 0.01 | 15 | 40 | 120 | 240 | 210 | 200 *2 | no change |
| Comparative example 15 | | 0.05 | 10 | 20 | 60 | 220 | 220 | 200 *2 | no change |
| Comparative example 16 | | 0.1 | 5 | 15 | 40 | 220 | 230 | 200 *2 | no change |
| Comparative example 17 | | 0.5 | 5 | 10 | 25 | 240 | 250 | 200 *2 | no change |
| Comparative example 18 | | 1.0 | 5 | 10 | 25 | 240 | 240 | 200 *2 | no change |

*1: Material partly broken
*2: Material wholly broken

As seen from Tables 1 and 2, the adhesive composition of matters used in Examples 1 and 2 admixed with 0.5 weight parts each of compounds (X=CH₃, Y=CH₃) added to the compositions of Examples 1 and 2, namely their setting time on steel plate, zinc chromate-plated steel plate or birch plate, were markedly improved as compared with comparative examples admixed with neither of the compounds of formulae (1) and (2), admixed with either but m<4 or those admixed with either of the reactive compound of the general formulae (11) and (12) not containing any urethane linkage. Further, tensile shear strength and compressive shear strength, too, were apparently improved and these properties are visible especially remarkably and tendentiously within a range of m≈4~90 in the above general formula (1) or (2).

As seen from Table 3, the set time can be shortened and the strength after setting is practically enough if the quantity of the reactive compound is not less than 0.01 part.

Thus, by admixing α-cyanoacrylate with a compound having acryloxy group or methacryloxy group copolymerizable with α-cyanoacrylate and also having urethane linkage in its molecule it is possible to markedly acidic or tending to dry.

We claim:

1. An α-cyanoacrylate adhesive composition of matter of matter consisting essentially of 100 weight parts of α-cyanoacrylate and at least 0.01~1.0 weight parts of at least a reactive compound represented by general formula (1) below:

General formula (1)

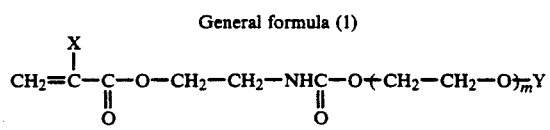

[wherein X represents a hydrogen atom or methyl group and Y an R or RCO (R represents a hydrocarbon residual group not containing any anion polymeric group, and m is an integer of 100≧m≧4].

2. An α-cyanoacrylate adhesive composition of matter according to claim 1, wherein X in said general formula (1) represents a methyl group and m is 4 or 23.

3. An α-cyanoacrylate adhesive composition of matter according to claim 1, wherein the reactive compound represented by said general formula (1) is replaced by a reactive compound represented by general formula (2):

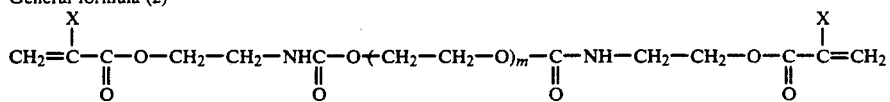

[wherein X represents a hydrogen atom or methyl group, and m is an integer of $100 \geq m \geq 4$].

4. An α-cyanoacrylate adhesive composition of matter according to claim 3, wherein X in said general formula (2) is a methyl group and m is 4 or 23.

5. An α-cyanoacrylate adhesive composition of matter consisting essentially of 100 weight parts of α-cyanoacrylate and $0.01 \sim 1.0$ weight parts of a reactive compound represented by general formula (3) below:

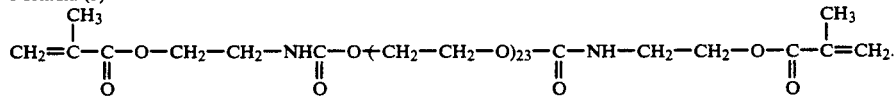

* * * * *